United States Patent Office

2,918,512
Patented Dec. 22, 1959

2,918,512

COMPOSITION CONTAINING BENZOTHIAZYL DISULFIDE DISPERSED IN A MINERAL OIL

Robert H. Cooper, Nitro, and Kenneth L. Godfrey, St. Albans, W. Va., assignors to Monsanto Chemical Company, St. Louis, Mo., a corporation of Delaware No Drawing. Application November 1, 1954
Serial No. 466,240

3 Claims. (Cl. 260—785)

The aryl thiazyl disulfides, of which benzothiazyl disulfide is an example, comprise a class of chemical compounds rather widely employed, both in this country and abroad, as accelerators of the vulcanization of rubber. These compounds, however, while desirable in the known advantages shown in the use mentioned, none the less possess several inherent properties or characteristics that are objectionable and which should be corrected to insure wider and more effective use.

The undesirable properties of the aryl thiazyl disulfide accelerators are well known. The compounds as a group are relatively high melting materials and as a consequence are difficult to disperse in a rubber composition. This lack of complete and homogeneous dispersion results in small bits of packed compressed bits of accelerator distributed through the rubber compound and develops small overcured areas in the finished product. Furthermore, the products tend to stick to metals and hence there is a tendency to lose a portion of the accelerator on the mixing equipment when the rubber compound is masticated and mixed, especially when the mixing is carried out on open mills. This same difficulty may also take place in Banbury milling. Moreover, the poorer the dispersion of the accelerator, the longer the period of time required for the accelerator to blend with the rubber to produce a uniform dry mix and this period required for the batch to "knit," especially in the Banbury cycle, is important, since if extended unduly, over-plasticization results which produces variable and generally less desirable physical properties in the vulcanized product. Again, the aryl thiazyl disulfides, having as before mentioned, a high melting point, must be finely ground for use in rubber, and as a result of this extreme fineness will dust readily in handling and will fly from the rubber mills during the mixing operation. The dust is bitter in taste, disagreeable in odor and is highly objectionable to those using or handling the product. It is the object of the present invention to remove or lessen the difficulties previously mentioned as well as to improve the handling properties and effectiveness of the class of accelerators named.

Although oils alone, and particularly the higher gravity mineral oils of the lubricating oil range, have often been distributed over the surface of the thiazyl disulfides in quantities of approximately 2% by weight thereof, while improving the dustiness of the product and reducing its tendency to fly, unfortunately also increases the tendency of the disulfide to stick to metal and also usually fails to improve dispersion. It has now been found that when a second ingredient, such as an alkyl ester of tall oil or sorbitan monopalmitate is added with the oil to the thiazyl disulfide, the difficulties previously mentioned are substantially avoided. The additives may be added in any convenient manner to the benzothiazyl disulfides but preferably are added to the slurry in which the precipitated disulfide is suspended, then filtering, drying and grinding the product. Naturally the slurry and additives must be thoroughly agitated in order that the additives may be distributed as completely as possible over the surfaces of the solid component of the slurry. It is desirable to add the respective additives in substantially equal weight portions to the slurry and in such quantities that the combined additives do not exceed 5% of the dry weight of the thiazyl disulfide. In case a solid additive, such as sorbitan monopalmitate be used, it is most effective when added as a water dispersion.

The following procedure was developed after many experiments and was adopted as effective for differentiating between the more than 20 additives tested and also as duplicating within experimental error, successive tests with the same additive. The tests were carried out in a Type 00 Banbury mill. The procedure follows:

*Step 1.*—Break down smoked sheet rubber for 6½ minutes at second speed (76 r.p.m.) and with cooling water shut off. Then sheet the rubber out on a rubber mill and allow to stand for about 16 hours.

*Step 2.*—Add the rubber sheets from Step 1 to a Banbury at 50° C., breaking down for 1 minute at second speed with the ram down and with cooling water shut off.

*Step 3.*—Add the treated benzothiazyl disulfide to the broken down rubber from Steps 1 and 2 and mix for 5½ minutes at third speed (100 r.p.m.) with the ram up and with cooling water turned on.

*Step 4.*—Discharge the masterbatch mix from the Banbury and pass twice through a rubber mill at 70° C. One pass through the mill with the rolls 0.125 inch apart and one pass with the rolls 0.187 inch apart is the best practice.

*Step 5.*—Allow the sheeted masterbatch to stand for at least four hours and then make cuts in the sheet at several places and examine under an 8× magnifying glass to determine the effectiveness of dispersion. Also during the various milling steps, notice was taken of any visible caking on the Banbury rotors and walls and on the rolls of the rubber mill. Additionally in Step 3, the number of minutes were observed that were required for the treated benzothiazyl disulfide to blend with the rubber so that a uniform dry mix was obtained.

Tested in the manner described, a treated benzothiazyl disulfide commercially available showed bad caking tendency, fair dispersion and a knit time of 2¾ minutes. Using 2.5% of a light viscosity petroleum lubricating oil, for example a 200 viscosity naphthenic pale oil, and 2.5% sorbitan monopalmitate in treating benzothiazyl disulfide, there resulted slight caking tendency, good dispersion and a knit time of 2 minutes. Again in another test, using 2.5% of "200 pale oil" and 2.5% of alkylated tall oil (45% methyl ester of rosin acids, 47% methyl ester of fatty acids, 8% unsaponifiable) there resulted only very slight caking, excellent dispersion and a knit time of 2½ minutes.

It is intended to cover all changes and modifications of the examples of the invention herein chosen for purposes of disclosure which do not constitute departures from the spirit and scope of the invention.

What is claimed is:

1. A composition consisting essentially of finely powdered benzothiazyl disulfide having intimately admixed therewith 2–2.5% by weight thereof of a mineral oil within the lubricating oil range and 2.5–3.0% by weight thereof of the methyl ester of tall oil.

2. A composition consisting essentially of finely powdered benzothiazyl disulfide having intimately admixed therewith approximately 5% by weight thereof of a mixture of a mineral oil within the light lubricating oil range, the mineral oil being present in amount at least about 2% by weight of the accelerator, and methyl esters of rosin acids and fatty acids contained in tall oil, the proportion of the ester component of said mixture being sufficient to improve dispersion in rubber as compared to said accelerator admixed with mineral oil alone, 3. A composition consisting essentially of finely powdered benzothiazyl disulfide having intimately admixed therewith approximately 2.5% by weight thereof of 200 viscosity pale oil and approximately 2.5% by weight thereof of a mixture of the methyl esters of rosin and fatty acids contained in tall oil.

References Cited in the file of this patent

UNITED STATES PATENTS 2,598,319 Throdahl _____ May 27, 1952

FOREIGN PATENTS 712,332 Great Britain _____ July 21, 1954